Figure 1:
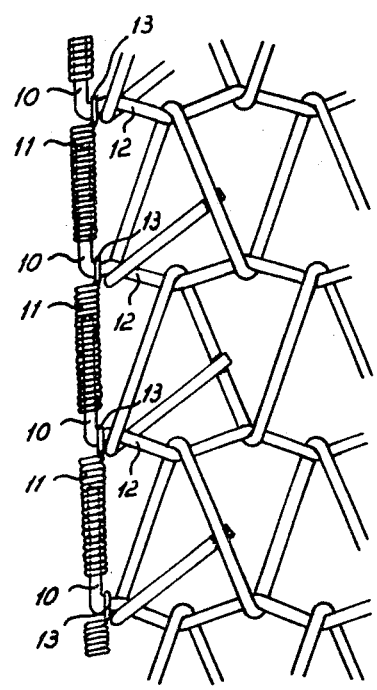

United States Patent

[11] 3,620,356

| [72] | Inventor | Jannes Jonge Poerink<br>25 Brins Bernhardlaan, Borne, Netherlands |
|---|---|---|
| [21] | Appl. No. | 844,385 |
| [22] | Filed | July 24, 1969 |
| [45] | Patented | Nov. 16, 1971 |
| [32] | Priority | July 26, 1968 |
| [33] | | Germany |
| [31] | | P 17 56 882 |

[54] WIRE MESH CONVEYOR BELT
2 Claims, 2 Drawing Figs.

| [52] | U.S. Cl. | 198/193 |
|---|---|---|
| [51] | Int. Cl. | B65g 15/30 |

[50] Field of Search..................................... 198/193, 189, 184

[56] References Cited
FOREIGN PATENTS
342,194  10/1921  Germany...................... 198/193

*Primary Examiner*—Edward A. Sroka
*Attorney*—Otto John Munz

ABSTRACT: A wire mesh conveyor belt of the type described, made of crossbars, with wire spirals connecting them, characterized by the feature that the ends (10) of said crossbars are bent over and provided with cylindrical edge members which connect said bent over ends with the next-following crossbar in the region of the bend thereon.

WIRE MESH CONVEYOR BELT

The invention relates to wire mesh conveyor belts and is concerned with the configuration of the longitudinal edges of wide and narrow spiral conveyor belts.

Wire mesh conveyor belts are already known, the crossbar ends of which are bent over at right angles to the longitudinal extension of the belt while forming the longitudinal edges of the belt; these ends are formed into loops through which the next crossbar engages, the ends of which in turn are also bent over in the same manner directly outside, behind the loops of the preceding crossbar. Owing to the formation of the longitudinal edges, such conveyor belts are called spiral belts with looped edges or S-edges.

Producing known wire mesh conveyor belts is difficult because a plurality of working stages are required, thus rendering the working cycle complex and slow, and keeping the manufacturing costs of the belts high. The crossbars not yet bent over at their ends are first inserted in the spirals and then the ends bent over substantially at right angles and then finally the loops formed and closed up.

A further undesirable feature of known belts with looped edges is their comparatively short life, which depends upon the durability of the longitudinal edges of the loops. A wire mesh conveyor belt of the kind described, although generally still being of good shape, may nevertheless be useless if the looped edges which constitute an essential component of the conveyor belts, are damaged or destroyed by natural wear and tear. Owing to the form of the loop edges these are subject to severe wear, and wear out quicker than the central belt region.

The operating properties of such looped-edge belts are not ideal. These belts are thicker at their longitudinal edges owing to the crossbar loops, than in the central belt region. The disadvantage of this is that the belt deflects when passing the driving and guide pulleys, this unfavorably affecting the running. Furthermore, difficulties are encountered when articles carried on the conveyor belt are pushed off sideways, because the raised-loop edges hold them back. A further disadvantage consists in that the edges of the loops are pressed into the pulley surfaces, which for better friction are covered with wood or rubber. Grooves form, and rapid wear occurs at the pulleys. Known spiral belts with looped edges always wear first at the raised edges. It may occur that the loops are so extensively worn that they break apart. Then the danger arises that loose pieces of wire interfere with the operation, or stick into the articles conveyed. Finally, it must be stressed that on assembly of known wire mesh conveyor belts the looped ends have to face downwards, since during operation it may occur that one or more loops open out.

The invention has as object to provide a wire mesh conveyor belt which has not got the disadvantages of known belts with regard to manufacture, life and operating properties.

The invention proposes a wire mesh conveyor belt made of crossbars, and spirals made of round or flat wire connecting them, in which the cross wire ends which are bent over at right angles or more by a few degrees inwardly towards the belt center, are provided with cylindrical edge elements which connect with the next following crossbar in the region of the bend.

Edge elements of coiled wire are mounted on crossbar ends bent at right angles, the part projecting beyond the end of the crossbar having a hook formed of the end of the wire which engages the adjacent crossbar.

Bushes are slipped over the crossbar ends bent at right angles, each part projecting beyond the end of the crossbar being provided with a groove to receive the adjacent crossbar, and clamping jaws to locate it.

Production of a conveyor belt in accordance with the invention is substantially simpler than in known looped-edge belts. Consequently the production costs are also lower. Prebent crossbars, i.e. crossbars bent twice at right angles or substantially at right angles, are simply inserted in the spirals. The edge members are mounted and the connection with the adjacent crossbar is effected by hooking the end portions in position, or clamping them together. The belts in accordance with the invention are also easier to couple together, i.e. made endless in an easy manner. As shown, manufacture is simpler and faster than hitherto.

The life of the said belts is substantially longer than that of known wire mesh conveyor belts. As is known, all belts become useless due to wear of the edges. Contact with frame components or guides may cause loop edges to break, though the belts may otherwise still be in good order. Since however the loop edges themselves belong to the conveyor belt, thus forming an inseparable component of such belts, their wear causes the whole belt to become useless. When the loop edges are destroyed or damaged, the conveyor belt becomes useless. In the wire mesh conveyor belts of the invention the belt edges which are subject to considerable wear are interchangeable edge members which are independent of the actual belt; these parts are made of a different highly wear resistant material. The coiled wire elements are made of very hard material, and bushes are preferably hardened. This is advantageous when the belt comes into contact with laterally mounted guides or framework parts. The edges in accordance with the invention are highly wear resistant, friction is lower and a quick interchange is ensured. The edge members may be made of plastics material. The edge members are made of a different material, such as a wear resistant material, from the belt itself.

As further advantage of belts in accordance with the invention concerns their good operating properties. The belt edges formed of edge members are thinner and at the most as thick as the belt itself or its spirals. The articles conveyed may be slid off the belt without difficulty such as that experienced when the belt is made with coiled-wire elements. Compared with conveyor belts having looped edges, the invention provides a particularly flat belt. When using coiled-wire elements as edge members, straight belt edges are provided. Furthermore it is an important factor that the belt of the invention is extremely flexible and is readily mounted in position or removed. Catching or jamming of the belt during operation is not possible. In known belts with looped edges it may occur that the crossbars become jammed in the narrow regions of the loops during the passage of the belt around a pulley or roller.

The drawings show two embodiments of the invention subject matter.

FIG. 1 is a plan view of a section of a wire mesh belt of the invention; the crossbar ends 10 are bent over at right angles and have edge members made of coiled wire 11 slipped thereover, the connection with the adjacent crossbar 12 being effected by means of the hooks 13.

Figure 2:
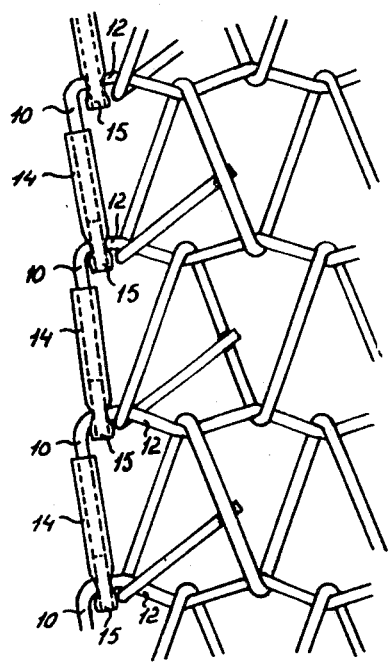

FIG. 2 is a plan view of a section of an alternative embodiment of the invention. The crossbar ends 10 here are bent slightly inwards. Sleeves 14 are slipped over the ends 10 of the crossbars and the clamping jaws 15 bent around the adjacent crossbars 12.

I claim:

1. A wire mesh conveyor belt comprising:
   a plurality of crossbars adjacent to each other;
   a plurality of cylindrical connecting elements;
   wire spirals connecting said crossbars, the ends of said crossbars being bent over toward each said adjacent crossbar and terminating short of said adjacent crossbar;
   said cylindrical connecting element surrounding the crossbar terminus;
   said element also being connected to said adjacent crossbar.

2. A wire mesh conveyor belt as recited in claim 1, said cylindrical connecting elements being made of coiled wire (11) slipped over the ends (10) of said bent-over crossbars, the part projecting beyond the end (10) of said crossbar having a hook (13) formed from said coiled wire end engaging around said adjacent crossbar (12).

* * * * *